(12) United States Patent
Rangaraj

(10) Patent No.: US 6,411,747 B2
(45) Date of Patent: Jun. 25, 2002

(54) WAVEGUIDE TYPE OPTICAL DEVICE

(75) Inventor: Madabhushi Rangaraj, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/778,720

(22) Filed: Feb. 8, 2001

Related U.S. Application Data

(63) Continuation of application No. 09/287,584, filed on Apr. 6, 1999, now abandoned.

(30) Foreign Application Priority Data

Apr. 6, 1998 (JP) .......................................... 10-093500

(51) Int. Cl.⁷ .............................................. G02F 1/035
(52) U.S. Cl. ................................ 385/2; 385/8; 385/14; 430/321
(58) Field of Search ............................ 385/2, 3, 14, 8, 385/9; 430/321, 317

(56) References Cited

U.S. PATENT DOCUMENTS

| | | | | |
|---|---|---|---|---|
| 5,563,965 A | * | 10/1996 | Madabhushi | ................... 385/2 |
| 5,895,742 A | * | 4/1999 | Lin | ............................ 385/2 X |

FOREIGN PATENT DOCUMENTS

| | | |
|---|---|---|
| JP | 61-267023 | 11/1986 |
| JP | 4-10433 | 1/1992 |
| JP | 4-268531 | 9/1992 |
| JP | 6-202053 | 7/1994 |
| JP | 9-185025 | 7/1997 |
| JP | 10-68914 | 3/1998 |

OTHER PUBLICATIONS

M. Rangaraj et al., "A Wide–Band Ti:LiNbO₃ Optical Modulator with a Conventional Coplanar Waveguide Type Electrode", pp. 1020–1022, IEEE Photonics Technology Letters, vol. 4, No. 9, Sep. 1992.

R. A. Becker, "Traveling–wave electro–optic modulator with maximum bandwidth–length product", pp. 1168–1170, Appl. Phys. Letter, vol. 45, No. 11, Dec. 1, 1984.

M. Seine et al., "20–GHz 3dB–Bandwidth Ti:LiNbO₃ Mach–Zehnder Modulator", pp. 999–1002, International Conference, ECOC'90.

K. Noguchi et al., "Highly Efficient 40–GHz Bandwidth Ti:LiNbO₃ Optical Modulator Employing Ridge Structure", pp. 52–54, IEEE Photonics Technology Letters, vol. 5, No. 1, Jan. 1993.

Mitomi et al., "Ultra High Speed LiNbO₃ Optical Modulator", pp. 39–44, Electronic Information Association Technical Research Report OPE95–25, Jun. 22, 1995.

\* cited by examiner

Primary Examiner—Phan T. H. Palmer
(74) Attorney, Agent, or Firm—Young & Thompson

(57) ABSTRACT

A waveguide type optical device with a traveling wave electrode structure, which has: a crystal substrate with electro-optic effect; an optical waveguide that is formed on the crystal substrate and waveguides light wave; a buffer layer that is formed on at least the optical waveguide and is of a dielectric material; and a signal electrode and an earth electrode that are formed on the buffer layer and control the optical output intensity of light wave waveguided through the optical waveguide. The traveling wave electrode structure has one signal electrode and two earth electrodes that are disposed sandwiching the signal electrode or one earth electrode that is disposed pairing with the signal electrode, at least the signal electrode of the traveling wave electrode structure is of a material that has a specific resistivity of $2.1 \times 10^{-6}$ Ωcm or lower at an environmental temperature that the waveguide type optical device is used.

8 Claims, 7 Drawing Sheets

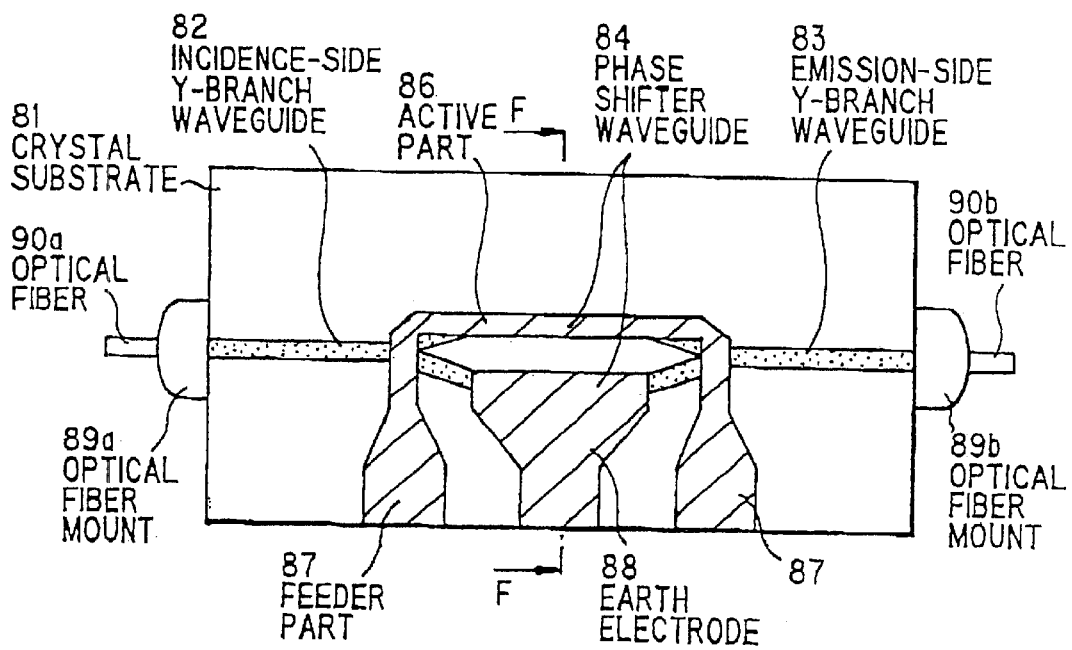
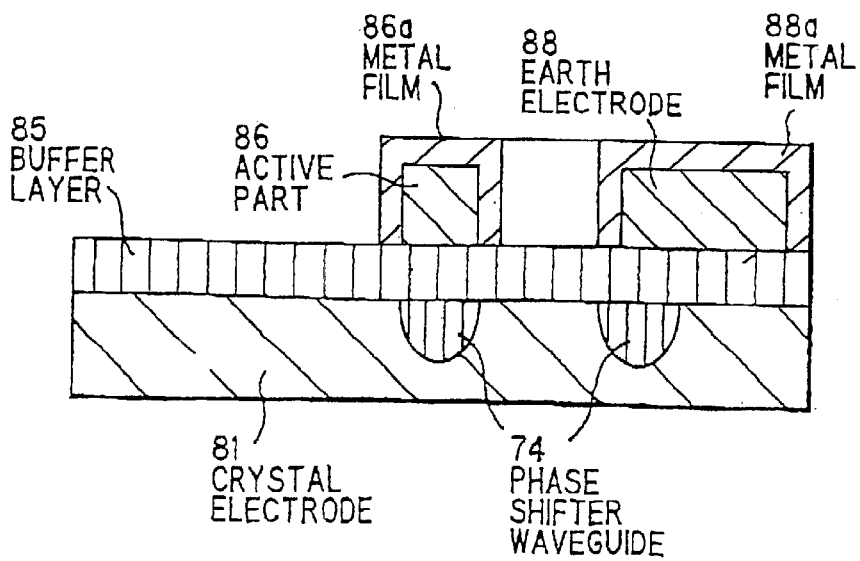

WAVEGUIDE TYPE OPTICAL DEVICE

CROSS-REFERENCE TO RELATED APPLICATIONS

This application is a continuation of application Ser. No. 09/287,584, filed Apr. 6, 1999, now abandoned.

FIELD OF THE INVENTION

This invention relates to a waveguide type optical device, such as a waveguide-type optical modulator and a waveguide-type optical switch, used in various optical systems including high-speed optical communication, optical switching network, optical information processing, and optical image processing.

BACKGROUND OF THE INVENTION

A waveguide-type optical modulator and a waveguide-type optical switch are important components to compose various optical systems including high-speed optical communication, optical switching network, optical information processing, and optical image processing. Especially a modulator using a $LiNbO_3$ substrate is a promising device since it has a smaller wavelength chirping in modulation than that of a semiconductor-system modulator, e.g., a modulator using a GaAs-system substrate.

Important parameters to determine the performance of $LiNbO_3$ optical modulator are drive power (or drive voltage), modulation bandwidth and insertion loss. Of these parameters, the modulation bandwidth and drive voltage are in trade-off relationship. Therefore, it is difficult to widen the modulation bandwidth as well as lowering the drive voltage. So, searches about waveguide-type optical modulator focus on the optimization of the trade-off relationship.

The bandwidth of waveguide-type optical modulator is mainly dependent on the kind, material and placement of electrode, and the permittivity of substrate. So, in order to widen the bandwidth of waveguide-type optical modulator, a traveling wave electrode is in wide use, and is formed as an extension of transmission line. Here, the characteristic impedance of electrode has to be equal to that of microwave power source and load. In this case, the modulation speed is restricted by the difference between the traveling times (or phase speeds or effective refractive indexes) of light wave and microwave. Meanwhile, as the traveling wave electrode structure used widely, there are two kinds of structures, i.e., an asymmetric strip line (hereinafter referred to as 'ASL') type or asymmetric coplanar strip (hereinafter referred to as 'ACPS') type electrode structure, and a coplanar waveguide (hereinafter referred to as 'CPW') type electrode structure.

The bandwidth of modulator is restricted by microwave attenuation $\alpha$, the speed discordance or effective refractive-index difference between light wave and microwave. To suppress the speed discordance, characteristic impedance and microwave attenuation, it is necessary to optimize the buffer-layer parameter and electrode parameter, particularly the width of signal electrode and the interval between signal electrode and earth electrode. However, even if the speed discordance could be suppressed, the bandwidth of modulator is restricted by microwave attenuation. So, to suppress the microwave attenuation is most important for realizing the wider bandwidth of modulation. Moreover, by reducing the microwave attenuation, the drive voltage in trade-off relationship with the bandwidth can be also controlled at the same time.

The microwave attenuation is caused by phenomena below.

(a) a loss in strip-line conductor that is a function of the form or structure of electrode (width of signal electrode, interval between signal electrode and earth electrode etc.), the resistivity of electrode material, buffer-layer parameter etc.

(b) a dielectric loss that is a function of the permittivity of $LiNbO_3$ substrate and tan $\delta$ (loss tangent)

(c) a loss due to higher-order mode propagation (d) a loss due to the impedance discordance between power-supply side characteristic impedance and load side characteristic impedance (normally, both characteristic impedances are matched into 50 $\Omega$)

(e) a loss in strip-line curved portion and tapered portion (f) a loss due to a mounting package and external package including a loss in a connector, a feeder part of signal electrode, connection method or material thereof.

About the above phenomena (a), (b), (c) and (d), the optimization of electrode parameter and buffer-layer parameter has been considered to some extent. The inventor of this application also discloses an optical modulator that using a thick CPW electrode structure, a bandwidth as wide as 20 GHz and a drive voltage as low as 5V are obtained, in "A Wide Band Ti:$LiNbO_3$ Optical Modulator with A Conventional Coplanar Waveguide Type Electrode", IEEE Photonics Technology Letters, Vol. 4, No. 9 (1992) (first prior art).

Adding to this, various optical modulators using ASL/ACPS type electrode structure or CPW electrode structure are suggested. The typical examples are disclosed in "Traveling-Wave Electro-Optic Modulator with Maximum Bandwidth-Length Product", Applied Physics Letters, Vol. 45, No. 11, pp. 1168–1170 (1984) (second prior art), "20-GHz 3 dB-Bandwidth Ti:$LiNbO_3$ Mach-Zehnder Modulator", International Conference, ECOC'90 pp. 999–1002 (1990) (third prior art), and "Highly Efficient 40-GHz Bandwidth Ti:$LiNbO_3$ Optical Modulator Employing Ridge Structure", IEEE Photonics Technology Letters, Vol. 5, No. 1, pp. 52–54 (1993) (fourth prior art).

In general, an electric band (S21 characteristic) of modulator is represented as below.

$$\alpha = \alpha_0 (f)^{1/2} L$$

where $\alpha$ is a microwave loss (or microwave attenuation) of all electrodes [dB], $\alpha_0$ is a microwave attenuation constant $[dB/\{cm(GHz)^{1/2}\}]$, f is a frequency [GHz], and L is an electrode length [cm].

The above electric band (frequency for S21-characteristic of 6 dB) is restricted by the microwave attenuation constant $\alpha_0$ of electrode, and further influenced by the optical characteristic. Thus, the reduction of microwave attenuation constant $\alpha_0$ of electrode is restricted by the entire bandwidth of device. Meanwhile, the values of microwave attenuation constant $\alpha_0$ of electrode in the above prior arts are 0.45 (first prior art), 3.75 (second prior art), 0.5 (third prior art) and 0.75 (fourth prior art).

However, in order to construct a further high-speed communication system for, e.g., 40 Gb/s, it is necessary to realize an optical modulator with a wide modulator band of 30 GHz or wider and a low drive voltage of 3.5 V or lower. Therefore, the microwave loss has to be further reduced.

Referring to FIGS. 1A and 1B, an example of waveguide type optical device, which is disclosed in the first prior art, is explained below. FIG. 1A is a plan view showing the conventional waveguide type optical device, and FIG. 1B is a cross sectional view cut along the line G—G in FIG. 1A.

In the conventional waveguide type optical device in FIGS. 1A and 1B, a titanium metal film strip is formed on a crystal substrate 101 with electro-optic effect, and, by internally-diffusing titanium into crystal of the crystal substrate 101, an incidence-side Y-branch waveguide 102, an emission-side Y-branch waveguide 103 and a phase shifter waveguide 104 are formed on the crystal substrate 101. Namely, on the crystal substrate 101, the two Y-branch waveguides to function as the incidence-side Y-branch waveguide 102 and emission-side Y-branch waveguide 103, and the phase shifter waveguide (Mach-Zehnder interferometer type) 104 with two arms are provided.

Also, on the crystal substrate 101, a buffer layer 105 composed of a dielectric material is formed. On the buffer layer 105, a CPW type electrode structure composed of one signal electrode 106 (107) and two earth electrodes 108 and 109 is formed. On the incidence and emission sides of the waveguide, optical fiber mounts 110a and 110b, respectively, are provided. Further, to the optical fiber mounts 110a and 110b, optical fibers 111a and 111b, respectively, are connected.

In operation, optical field (ray of light) propagated through the optical fiber 111a passes through the optical fiber mount 110a, being input to the incidence-side Y-branch waveguide 102, propagating through the phase shifter waveguide 104 and emission-side Y-branch waveguide 103, then passing through the optical fiber mount 110b, being output to the optical fiber 111b.

In this process, incident light is divided into two equal parts (light waves) by the incidence-side Y-branch waveguide 102, and propagated through the two arms of the phase shifter waveguide 104. When the phase shifting is not applied between the two arms of the phase shifter waveguide 104, i.e., when no external voltage is applied between the two arms, two light waves are in phase connected by the emission-side Y-branch waveguide 103, output to the optical fiber 111b without reducing the optical output intensity. On the other hand, when the phase shift π is given between the two arms by applying each external voltage, two light waves are subject to the compensating interference in the emission-side Y-branch waveguide 103, thereby the optical output intensity (intensity of light output from the emission side) becomes a minimum value or zero.

Thus, by applying the external voltage, light wave passing through the waveguide type optical device can be turned ON or OFF. So, the switching or modulation control of light wave passing through the waveguide type optical device can be performed. Also, by applying so called high-frequency microwave between the two arms of the phase shifter waveguide 104 by using the external voltage, the concerned waveguide type optical device can operate as a high-band optical modulator. In this case, for example, with an electrode length of 3 cm, a microwave attenuation constant $\alpha_0$ of 0.5 dB/{cm(GHz)$^{1/2}$} and a drive voltage of 4 V, the electric band (frequency for S21-characteristic of 6 dB) is 16 GHz.

However, as described earlier, in order to construct a further high-speed communication system for, e.g., 40 Gb/s, it is necessary to realize an optical modulator with a modulator band as wide as 30 GHz or wider and a drive voltage as low as 3.5 V or lower. For that purpose, the microwave attenuation constant $\alpha_0$ needs to be 0.37 dB/{cm(GHz)$^{1/2}$}. Namely, the microwave loss must be reduced about 26%, comparing the above example for a microwave attenuation constant $\alpha_0$ of 0.5 dB/{cm(GHz)$^{1/2}$}. Therefore, it is necessary to further reduce the microwave loss (particularly loss in strip line conductor of traveling wave electrode structure) as well as further reducing the drive voltage.

In general, in case of a low electrode resistivity, microwave propagates through the electrode without reducing much. So, by further reducing the electrode resistivity, the microwave loss in the entire electrode can be reduced, thereby allowing the waveguide type optical device (modulator) to provide a further wide bandwidth and high-speed operation.

For example, the electrode resistivity R is given by:

$$R = \rho \, L/A$$

where ρ is a specific resistivity of electrode material, L is a length of electrode and A is an area (=electrode width× electrode thickness) of electrode. Thus, the larger the electrode area A is or the smaller the specific resistivity ρ is, the smaller the electrode resistivity R is.

As explained earlier, the bandwidth of modulator is restricted by microwave attenuation, the speed discordance or effective refractive-index difference between light wave and microwave. To suppress the speed discordance and the characteristic impedance, it is necessary to design to optimize the buffer-layer parameter and electrode parameter. So, at the stage of designing, the parameters are determined. Namely, at the stage of designing, the size of electrode area A, as well as the value of electrode resistivity R, must be determined. Meanwhile, the electrode length L is determined by the trade-off relationship between drive voltage and bandwidth.

Since the electrode parameters are thus determined already, it is difficult to further reduce the loss in strip line conductor of traveling wave electrode structure. So, the remaining means to further reduce the loss in traveling wave electrode structure is to change the resistivity of electrode material. The electrode material used thus far is limited to gold, copper or the like mainly due to its low specific resistivity ρ. The specific resistivity ρ of gold is $2.05 \times 10^{-6}$ Ωcm at a temperature of 0° C., 2.15 to $2.2 \times 10^{-6}$ Ωcm at 20° C., and $2.88 \times 10^{-6}$ Ωcm at 100° C. For example, with an electrode length L of 4 cm, an electrode width w of 7 μm, an electrode thickness of 25 μm and a specific resistivity ρ (gold, 20° C.) of $2.15 \times 10^{-6}$ Ωcm, the electrode resistivity is 4.9 Ω.

SUMMARY OF THE INVENTION

Accordingly, it is an object of the invention to provide a waveguide type optical device that realizes a wider bandwidth and a higher-speed operation.

According to the invention, a waveguide type optical device with a traveling wave electrode structure, comprises:

a crystal substrate with electro-optic effect;

an optical waveguide that is formed on the crystal substrate and waveguides light wave;

a buffer layer that is formed on at least the optical waveguide and is of a dielectric material; and a signal electrode and an earth electrode that are formed on the buffer layer and control the optical output intensity of light wave waveguided through the optical waveguide;

wherein the traveling wave electrode structure is composed of the one signal electrode and the two earth electrodes that are disposed sandwiching the signal electrode, at least the signal electrode of the traveling wave electrode structure is of a material that has a specific resistivity of $2.1 \times 10^{-6}$ Ωcm or lower at an environmental temperature that the waveguide type optical device is used.

According to another aspect of the invention, a waveguide type optical device with a traveling wave electrode structure, comprises:

a crystal substrate with electro-optic effect;

an optical waveguide that is formed on the crystal substrate and waveguides light wave;

a buffer layer that is formed on at least the optical waveguide and is of a dielectric material; and a signal electrode and an earth electrode that are formed on the buffer layer and control the optical output intensity of light wave waveguided through the optical waveguide;

wherein the traveling wave electrode structure is composed of the one signal electrode and the one earth electrode that is disposed pairing with the signal electrode, at least the signal electrode of the traveling wave electrode structure is of a material that has a specific resistivity of $2.1 \times 10^{-6}$ Ωcm or lower at an environmental temperature that the waveguide type optical device is used.

BRIEF DESCRIPTION OF THE DRAWINGS

The invention will be explained in more detail in conjunction with the appended drawings, wherein:

FIG. 7A is a plan view showing a waveguide type optical device in a sixth preferred embodiment according to the invention, and FIG. 7B is a cross sectional view cut along the line F—F in FIG. 7A.

DESCRIPTION OF THE PREFERRED EMBODIMENTS

Figure 1A:
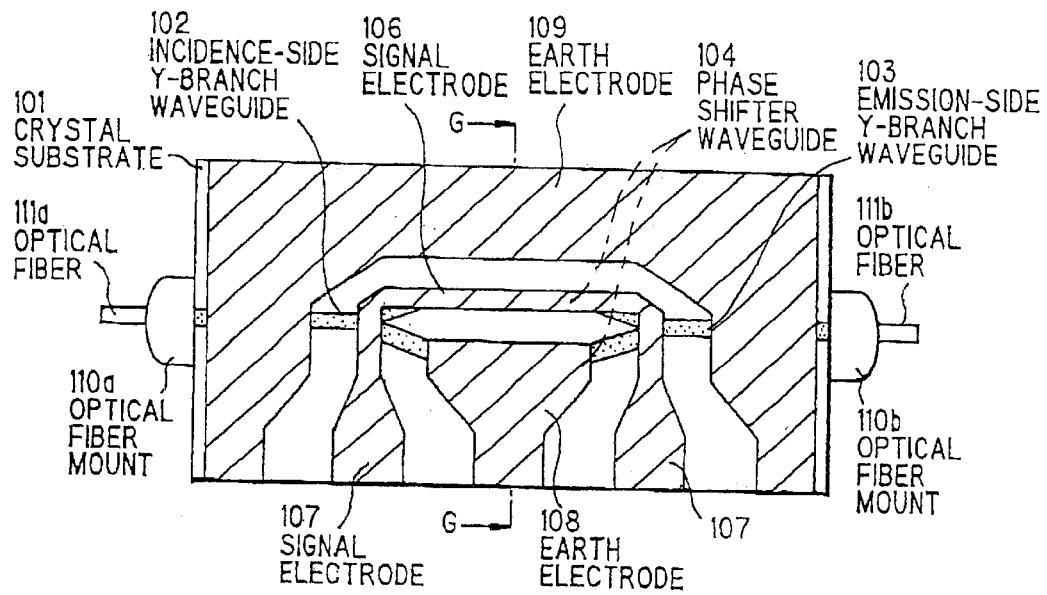
FIG. 1A is a plan view showing the conventional waveguide type optical device.
Figure 1B:
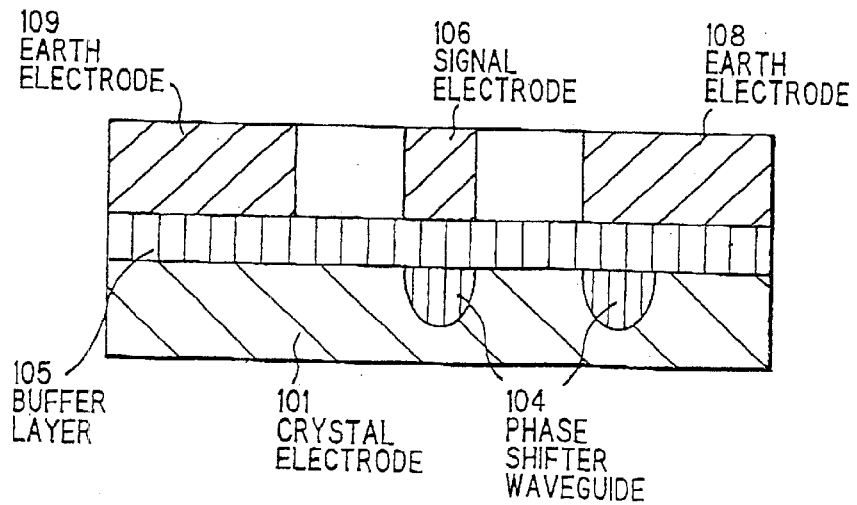
FIG. 1B is a cross sectional view cut along the line G—G in FIG. 1A.

The preferred embodiments according to the invention will be explained below, referring to the drawings.

<First Embodiment>

Figure 2A:
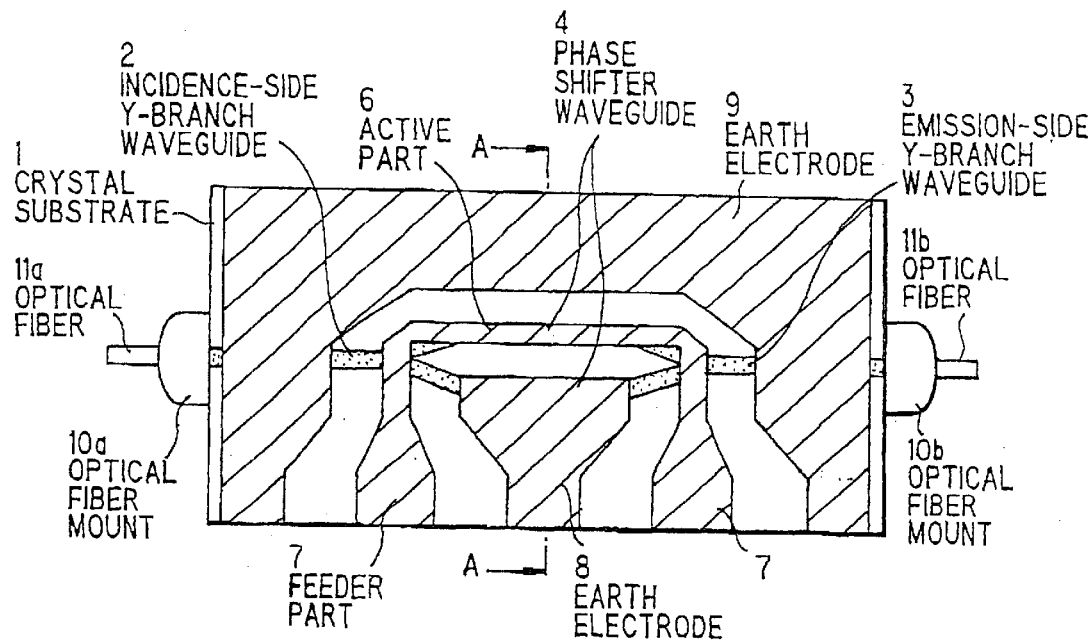
FIG. 2A is a plan view showing a waveguide type optical device in a first preferred embodiment according to the invention.
Figure 2B:
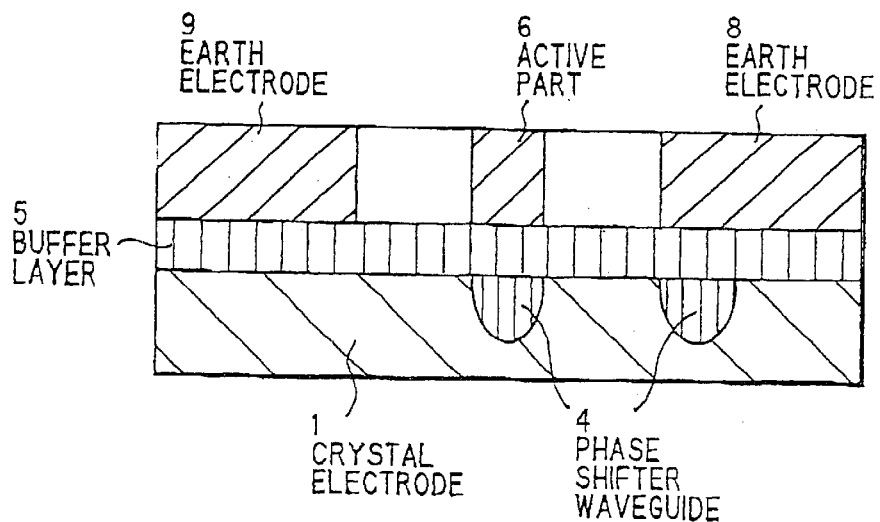
FIG. 2B is a cross sectional view cut along the line A—A in FIG. 2A.

FIG. 2A is a plan view showing a waveguide type optical device in the first preferred embodiment according to the invention, and FIG. 2B is a cross sectional view cut along the line A—A in FIG. 2A.

As shown in FIGS. 2A and 2B, in the waveguide type optical device in the first embodiment, a titanium metal film strip of 5 to 20 μm wide and 500 to 1200 Å thick is formed on a crystal substrate 1 with electro-optic effect, and, by internally-diffusing titanium into crystal of the crystal substrate 1 at 900 to 1100° C. for 5 to 1220 hours, an incidence-side Y-branch waveguide 2, an emission-side Y-branch waveguide 3 and a phase shifter waveguide 4 are formed on the crystal substrate 1. Namely, on the crystal substrate 1, the two Y-branch waveguides to function as the incidence-side Y-branch waveguide 2 and emission-side Y-branch waveguide 3, and the phase shifter waveguide (Mach-Zehnder interferometer type) 4 with two arms are provided.

Also, on the crystal substrate 1, a 1 to 10 μm thick buffer layer 5 composed of a dielectric material with a permittivity of 1.1 to 40 is formed. On the buffer layer 5, a CPW type electrode structure, which is a traveling wave electrode structure, composed of one signal electrode and two earth electrodes 8 and 9 is formed. The signal electrode is composed of active part 6 of 5 to 50 μm wide, 10 to 70 mm long and 3 to 40 μm thick, and feeder part 7 with curved part and tapered part. On the other hand, the earth electrodes 8, 9 are formed to be 100 to 9000 μm wide, 10 to 70 mm long and 3 to 40 μm thick, and are disposed sandwiching the signal electrode. The signal electrode and earth electrodes 8, 9 are formed by precipitating metal, e.g., silver, with a lower specific resistivity ρ than that in prior arts by using electrolytic plating or electroless plating, or by spraying such metal on the buffer layer 5.

Also, on the incidence and emission sides of the waveguide, optical fiber mounts 10a and 10b, respectively, are provided. Further, to the optical fiber mounts 10a and 10b, optical fibers 11a and 11b, respectively, are connected.

In operation, optical field (ray of light) propagated through the optical fiber 11a passes through the optical fiber mount 10a, being input to the incidence-side Y-branch waveguide 2, propagating through the phase shifter waveguide 4 and emission-side Y-branch waveguide 3, then passing through the optical fiber mount 10b, being output to the optical fiber 11b.

In this process, incident light is divided into two equal parts (light waves) by the incidence-side Y-branch waveguide 2, and propagated through the two arms of the phase shifter waveguide 4. When the phase shifting is not applied between the two arms of the phase shifter waveguide 4, i.e., when no external voltage is applied between the two arms, two light waves are in phase connected by the emission-side Y-branch waveguide 3, output to the optical fiber 11b without reducing the optical output intensity. On the other hand, when the phase shift π is given between the two arms by applying each external voltage, two light waves are subject to the compensating interference in the emission-side Y-branch waveguide 3, thereby the optical output intensity (intensity of light output from the emission side) becomes a minimum value or zero.

Thus, by applying the external voltage, light wave passing through the waveguide type optical device can be turned ON or OFF. So, the switching or modulation control of light wave passing through the waveguide type optical device can be performed. Also, by applying so called high-frequency microwave between the two arms of the phase shifter waveguide 4 by using the external voltage, the concerned waveguide type optical device can operate as a high-band optical modulator. Meanwhile, microwave is supplied from an external voltage source through an external connector (not shown) to the signal electrode. The microwave supplied to the signal electrode is propagated through the feeder part 7 to the active part 6.

As described earlier, in the waveguide type optical device in this embodiment, the signal electrode and the earth electrodes 8, 9 are of metal with a lower specific resistivity $\rho$ than that in prior arts. For example, the specific resistivity $\rho$ of silver is $1.47 \times 10^{-6}$ $\Omega$cm at a temperature of 0° C., 1.5 to $1.6 \times 10^{-6}$ $\Omega$cm at 20° C., and $2.1 \times 10^{-6}$ $\Omega$cm at 100° C. So, when the signal electrode and the earth electrodes 8, 9 are of silver as an example of metal material with a lower specific resistivity $\rho$ than that in prior arts, with an electrode length L of 4 cm, an electrode width w of 7 $\mu$m, an electrode thickness of 25 $\mu$m and a specific resistivity $\rho$ (at a temperature of 20° C.) of $1.5 \times 10^{-6}$ $\Omega$cm, the electrode resistivity is 3.4 $\Omega$.

Thus, comparing the electrode resistivity R of 4.9 $\Omega$ obtained when the electrode with the same dimensions as above employs gold, the electrode resistivity R in this embodiment is reduced by about 31%. Due to this, the microwave loss is reduced and therefore the modulator can be provided with a wider bandwidth. Further, since the electrode resistivity R reduces, the drive voltage required can be also reduced. Thereby, the waveguide type optical device can realize a wider bandwidth and a higher-speed operation.

Also, for a silver electrode with the above dimensions, when the specific resistivity $\rho$ of silver is $2.1 \times 10^{-6}$ $\Omega$cm at a temperature of 100° C., the electrode resistivity R is 4.8 $\Omega$. In contrast with this, for a gold electrode with the above dimensions, since, as described earlier, the specific resistivity $\rho$ of gold is $2.88 \times 10^{-6}$ $\Omega$cm at a temperature of 100° C., the electrode resistivity R is 6.6 $\Omega$. Thus, when silver is used as the electrode material at a device temperature of 100° C., the electrode resistivity R is reduced by about 27%, comparing with that in using gold. Accordingly, in order to reduce the microwave loss to realize the wide bandwidth of modulator and the lowering of drive voltage, it is preferable that a material with a specific resistivity $\rho$ of $2.1 \times 10^{-6}$ or less $\Omega$cm is used for the electrode.

<Second Embodiment>

Figure 3A:
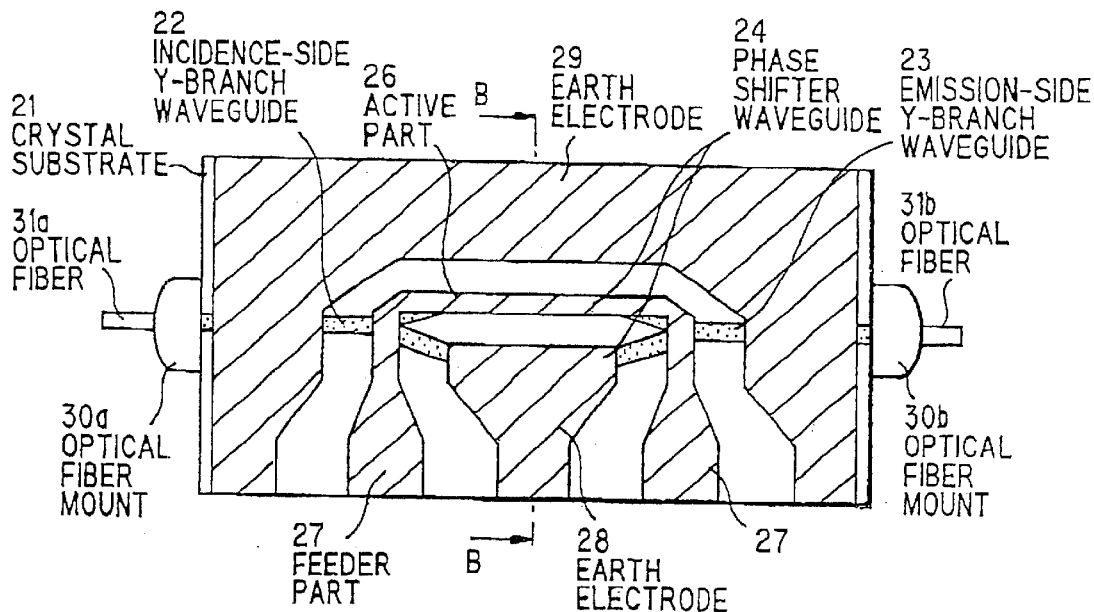
FIG. 3A is a plan view showing a waveguide type optical device in a second preferred embodiment according to the invention.
Figure 3B:
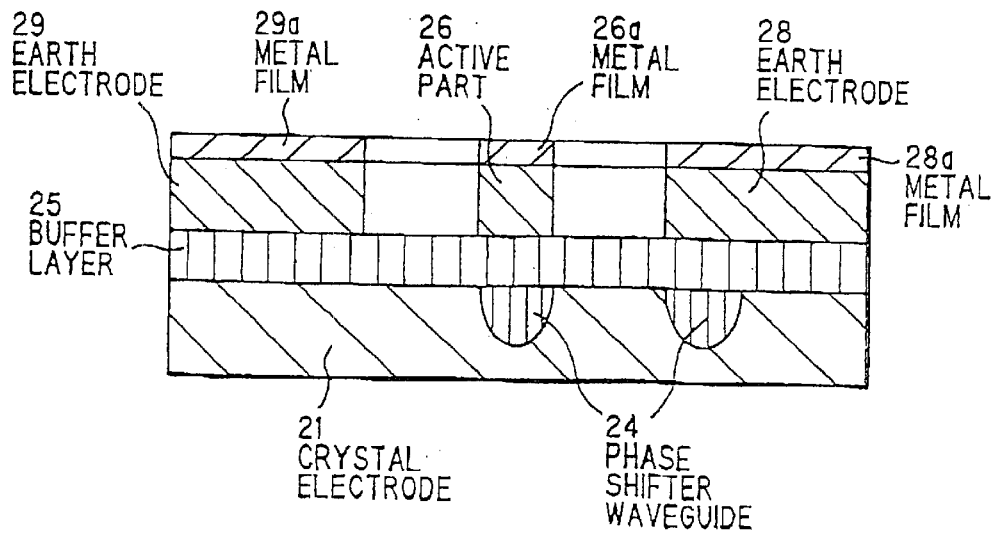
FIG. 3B is a cross sectional view cut along the line B—B in FIG. 3A.

FIG. 3A is a plan view showing a waveguide type optical device in the second preferred embodiment according to the invention, and FIG. 3B is a cross sectional view cut along the line B—B in FIG. 3A.

However, the respective components of the waveguide type optical device in the second embodiment in FIGS. 3A and 3B, i.e., a crystal substrate 21, an incidence-side Y-branch waveguide 22, an emission-side Y-branch waveguide 23, a phase shifter waveguide 24, a buffer layer 25, active part 26 and feeder part 27 of signal electrode, earth electrodes 28, 29, optical fiber mounts 30a, 30b, and optical fibers 31a, 31b are similar to those of the waveguide type optical device in the first embodiment in FIGS. 2A and 2B. Therefore, the tautological explanations thereof are omitted.

As shown in FIG. 3B, in the this embodiment, to prevent the signal electrode and the earth electrodes 28, 29 from being oxidized, metal film 26a, 28a and 29a is formed by using electrolytic plating or electroless plating or spraying, on the top of the respective electrodes. Meanwhile, metal film formed on the top of the feeder part 27 of the signal electrode is not shown. This metal film is formed 0.01 to several micrometers thick and is of metal that is not oxidized even when exposed in the atmosphere for a long period.

With this composition, the waveguide type optical device in this embodiment can prevent the electrode resistivity R from increasing due to the oxidation of the signal electrode and the earth electrodes 28, 29. Thereby, the waveguide type optical device can maintain the wide bandwidth of modulator and the lowering of drive voltage, for a long period.

<Third Embodiment>

Figure 4A:
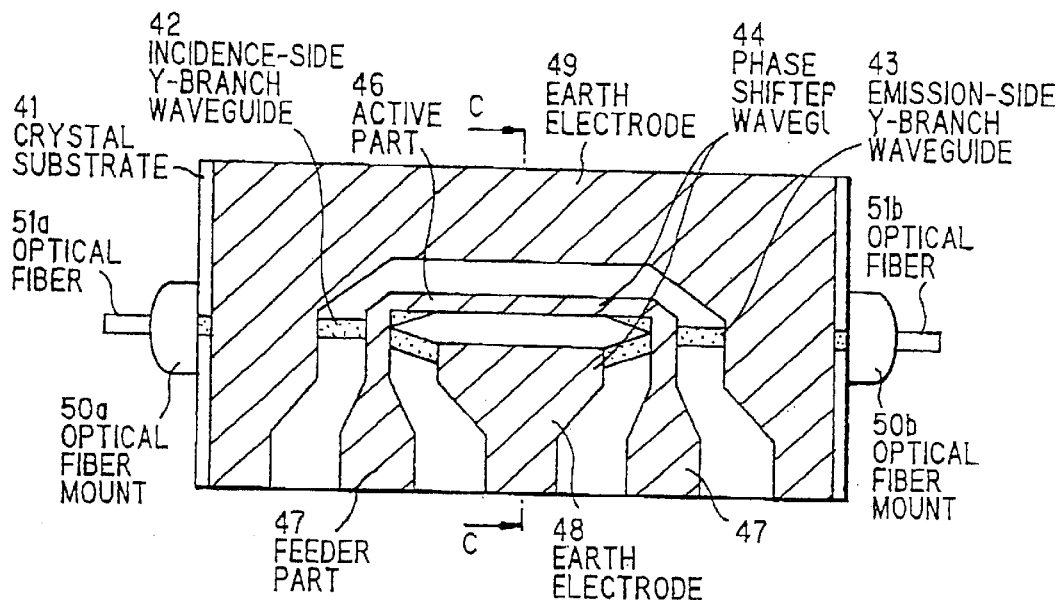
FIG. 4A is a plan view showing a waveguide type optical device in a third preferred embodiment according to the invention.
Figure 4B:
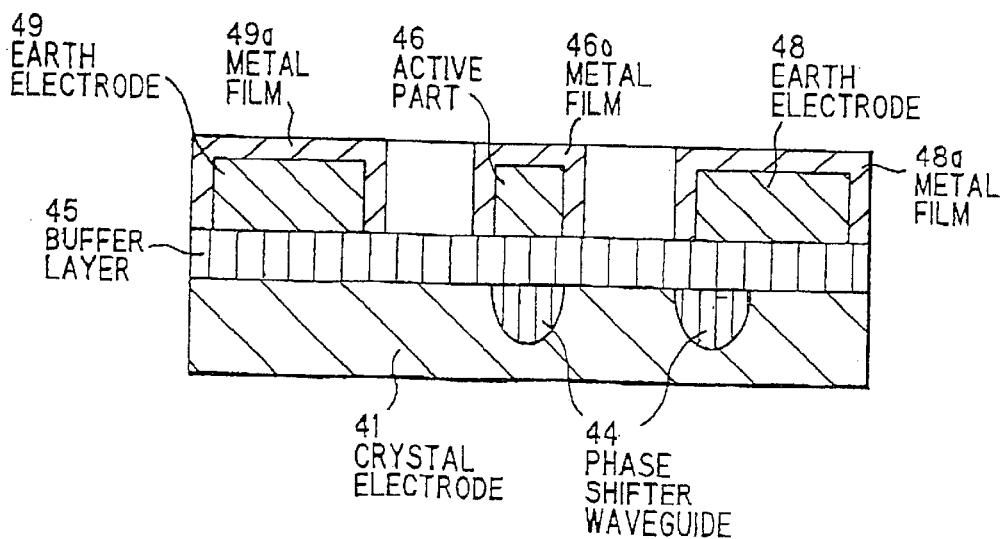
FIG. 4B is a cross sectional view cut along the line C—C in FIG. 4A.

FIG. 4A is a plan view showing a waveguide type optical device in the third preferred embodiment according to the invention, and FIG. 4B is a cross sectional view cut along the line C—C in FIG. 4A.

However, the respective components of the waveguide type optical device in the third embodiment in FIGS. 4A and 4B, i.e., a crystal substrate 41, an incidence-side Y-branch waveguide 42, an emission-side Y-branch waveguide 43, a phase shifter waveguide 44, a buffer layer 45, active part 46 and feeder part 47 of signal electrode, earth electrodes 48, 49, optical fiber mounts 50a, 50b, and optical fibers 51a, 51b are similar to those of the waveguide type optical device in the first embodiment in FIGS. 2A and 2B. Therefore, the tautological explanations thereof are omitted.

As shown in FIG. 4B, in this embodiment, to prevent the signal electrode and the earth electrodes 48, 49 from being oxidized, metal film 46a, 48a and 49a is formed by using electrolytic plating or electroless plating or spraying, on the top and sides of the respective electrodes. Meanwhile, metal film formed on the top and sides of the feeder part 47 of the signal electrode is not shown. This metal film is formed 0.01 to several micrometers thick and is of metal that is not oxidized even when exposed in the atmosphere for a long period.

Since the signal electrode and the earth electrodes 48, 49 have the top and sides covered with metal film and any part of them are thereby not exposed in the atmosphere, the waveguide type optical device in this embodiment can more securely prevent the electrode resistivity R from increasing due to the oxidation of the signal electrode and the earth electrodes 48, 49. Thereby, the waveguide type optical device can maintain the wide bandwidth of modulator and the lowering of drive voltage, for a long period.

<Fourth Embodiment>

Figure 5A:
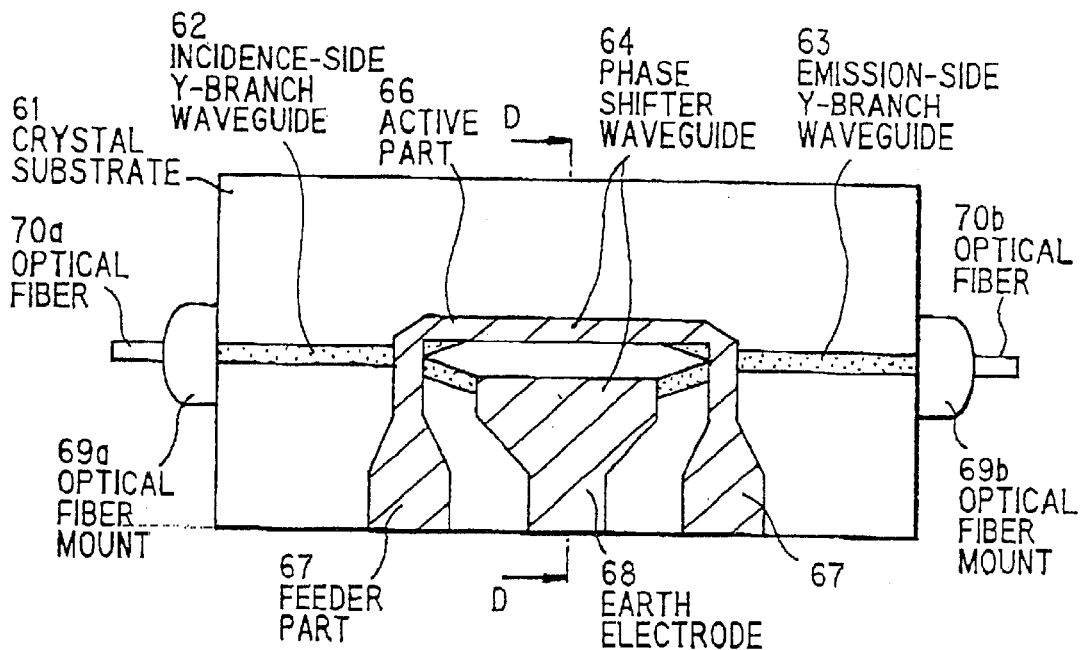
FIG. 5A is a plan view showing a waveguide type optical device in a fourth preferred embodiment according to the invention.
Figure 5B:
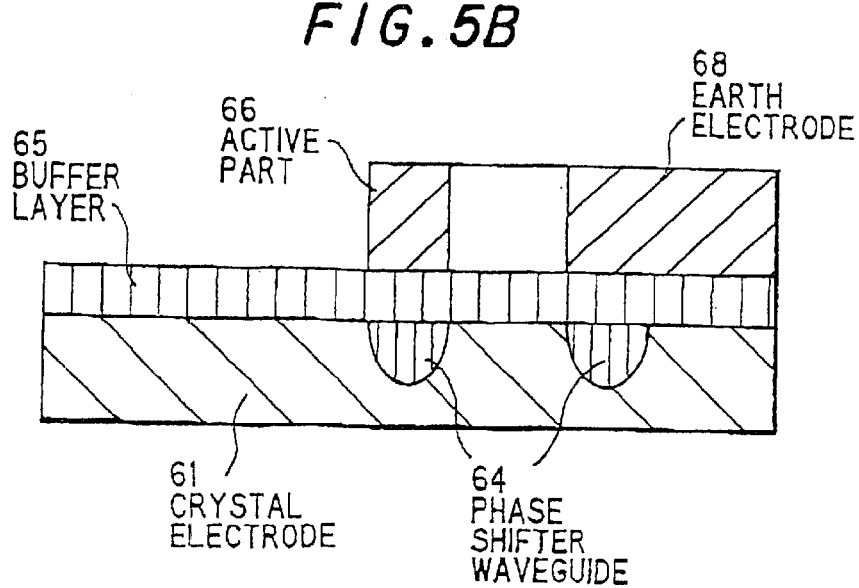
FIG. 5B is a cross sectional view cut along the line D—D in FIG. 5A.

FIG. 5A is a plan view showing a waveguide type optical device in the fourth preferred embodiment according to the invention, and FIG. 5B is a cross sectional view cut along the line D—D in FIG. 5A.

As shown in FIGS. 5A and 5B, in the waveguide type optical device in the this embodiment, a titanium metal film strip of 5 to 20 $\mu$m wide and 500 to 1200 Å thick is formed on a crystal substrate 61 with electro-optic effect, and, by internally-diffusing titanium into crystal of the crystal substrate 61 at 900 to 1100° C. for 5 to 1220 hours, an incidence-side Y-branch waveguide 62, an emission-side Y-branch waveguide 63 and a phase shifter waveguide 64 are formed on the crystal substrate 61. Namely, on the crystal substrate 61, the two Y-branch waveguides to function as the incidence-side Y-branch waveguide 62 and emission-side Y-branch waveguide 63, and the phase shifter waveguide (Mach-Zehnder interferometer type) 64 with two arms are provided.

Also, on the crystal substrate 61, a 1 to 10 $\mu$m thick buffer layer 65 composed of a dielectric material with a permittivity of 1.1 to 40 is formed. In this embodiment, on the buffer layer 65, an ASL or ACPS type electrode structure composed of one signal electrode and one earth electrode 68 is formed. The signal electrode is composed of active part 66 of 5 to 50 $\mu$m wide, 10 to 70 mm long and 3 to 40 $\mu$m thick, and feeder part 67 with curved part and tapered part. On the other hand, the earth electrode 68 is formed to be 100 to 9000 μm wide, 10 to 70 mm long and 3 to 40 μm thick, and is disposed pairing with the signal electrode. The signal electrode and earth electrode 68 are formed by precipitating metal, e.g., silver, with a lower specific resistivity ρ than that in prior arts by using electrolytic plating or electroless plating, or by spraying such metal on the buffer layer 65.

Also, on the incidence and emission sides of the waveguide, optical fiber mounts 70a and 70b, respectively, are provided. Further, to the optical fiber mounts 70a and 70b, optical fibers 71a and 71b, respectively, are connected.

Also in this embodiment where the ASL or ACPS type electrode structure is employed, due to the signal electrode and earth electrode formed with a lower specific resistivity ρ than that in prior arts, the electrode resistivity R is reduced compared with that of prior arts. Due to this, the microwave loss is reduced and therefore the modulator can be provided with a wider bandwidth. Further, since the electrode resistivity R reduces, the drive voltage required can be also reduced. Thereby, the waveguide type optical device can realize a wider bandwidth and a higher-speed operation.

<Fifth Embodiment>

Figure 6A:
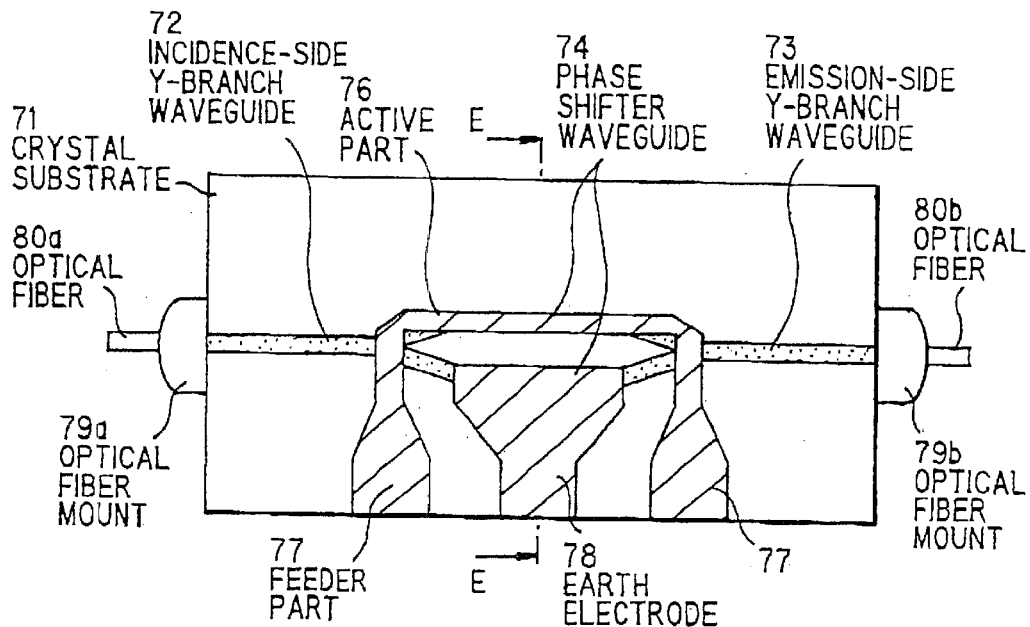
FIG. 6A is a plan view showing a waveguide type optical device in a fifth preferred embodiment according to the invention.
Figure 6B:
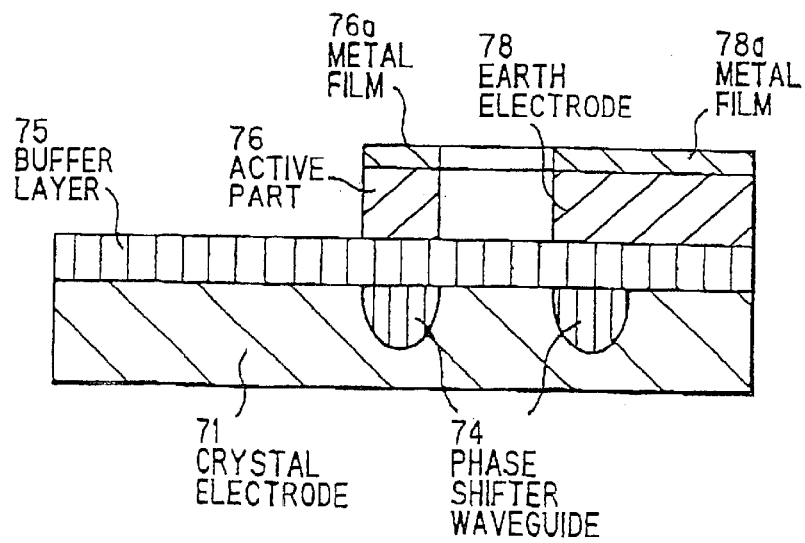
FIG. 6B is a cross sectional view cut along the line E—E in FIG. 6A.

FIG. 6A is a plan view showing a waveguide type optical device in the fifth preferred embodiment according to the invention, and FIG. 6B is a cross sectional view cut along the line E—E in FIG. 6A.

However, the respective components of the waveguide type optical device in the this embodiment in FIGS. 6A and 6B, i.e., a crystal substrate 71, an incidence-side Y-branch waveguide 72, an emission-side Y-branch waveguide 73, a phase shifter waveguide 74, a buffer layer 75, active part 76 and feeder part 77 of signal electrode, an earth electrode 78, optical fiber mounts 79a, 79b, and optical fibers 80a, 80b are similar to those of the waveguide type optical device in the fourth embodiment in FIGS. 5A and 5B. Therefore, the tautological explanations thereof are omitted.

As shown in FIG. 6B, in the this embodiment, to prevent the signal electrode and the earth electrode 78 from being oxidized, metal film 76a, 78a is formed by using electrolytic plating or electroless plating or spraying, on the top of respective electrodes. Meanwhile, metal film formed on the top of the feeder part 77 of the signal electrode is not shown. This metal film is formed 0.01 to several micrometers thick and is of metal that is not oxidized even when exposed in the atmosphere for a long period.

With this composition, the waveguide type optical device in this embodiment can prevent the electrode resistivity R from increasing due to the oxidation of the signal electrode and the earth electrode 78. Thereby, the waveguide type optical device can maintain the wide bandwidth of modulator and the lowering of drive voltage, for a long period.

<Sixth Embodiment>

FIG. 7A is a plan view showing a waveguide type optical device in the sixth preferred embodiment according to the invention, and FIG. 7B is a cross sectional view cut along the line F—F in FIG. 7A.

However, the respective components of the waveguide type optical device in this embodiment in FIGS. 7A and 7B, i.e., a crystal substrate 81, an incidence-side Y-branch waveguide 82, an emission-side Y-branch waveguide 83, a phase shifter waveguide 84, a buffer layer 85, active part 86 and feeder part 87 of signal electrode, an earth electrode 88, optical fiber mounts 89a, 89b, and optical fibers 90a, 90b are similar to those of the waveguide type optical device in the fourth embodiment in FIGS. 5A and 5B. Therefore, the tautological explanations thereof are omitted.

As shown in FIG. 7B, in this embodiment, to prevent the signal electrode and the earth electrode 88 from being oxidized, metal film 86a, 88a is formed by using electrolytic plating or electroless plating or spraying, on the top and sides of the respective electrodes. Meanwhile, metal film formed on the top and sides of the feeder part 87 of the signal electrode is not shown. This metal film is formed 0.01 to several micrometers thick and is of metal that is not oxidized even when exposed in the atmosphere for a long period.

Since the signal electrode and the earth electrode 88 have the top and sides covered with metal film and any part of them are thereby not exposed in the atmosphere, the waveguide type optical device in this embodiment can more securely prevent the electrode resistivity R from increasing due to the oxidation of the signal electrode and the earth electrode 88. Thereby, the waveguide type optical device can maintain the wide bandwidth of modulator and the lowering of drive voltage, for a long period.

EXAMPLE

An example of the waveguide type optical device in FIGS. 2A and 2B is described below.

In this example, a titanium metal film strip of 7 μm wide and 1000 Å thick is formed on a crystal substrate 1 with electro-optic effect, and, by internally-diffusing titanium into crystal of the crystal substrate 1 at 1050° C. for 10 hours, an incidence-side Y-branch waveguide 2, an emission-side Y-branch waveguide 3 and a phase shifter waveguide 4 are formed on the crystal substrate 1.

Also, on the crystal substrate 1, a 1.2 μm thick buffer layer 5 of $SiO_2$ is formed. On the buffer layer 5, a CPW type electrode structure composed of one signal electrode and two earth electrodes 8 and 9 is formed. The signal electrode is composed of active part 6 of 5 μm wide, 30 mm long and 30 μm thick, and feeder part 7 with curved part and tapered part. On the other hand, the earth electrodes 8, 9 are formed to be 1250 μm wide and 30 μm thick. The signal electrode and earth electrodes 8, 9 are formed using metal, silver, with a lower specific resistivity ρ than that in prior arts by electrolytic plating.

Also, on the incidence and emission sides of the waveguide, optical fiber mounts 10a and 10b, respectively, are provided. Further, to the optical fiber mounts 10a and 10b, optical fibers 11a and 11b, respectively, are connected.

The waveguide type optical device thus composed has an electrode resistivity R of 2.1 Ω for the signal electrode. In contrast with this, when gold as the material of the signal electrode formed with the same dimensions is used instead of silver, the electrode resistivity R for the signal electrode becomes 3.1 Ω.

Thus, the electrode resistivity R in this example is reduced by about 32% comparing with that in prior art. Due to this, the loss of microwave to propagate through the signal electrode is reduced and the electric band can be widened according to the rate that the electrode resistivity R, thereby reducing the drive voltage. As a result, the electric band of the waveguide type optical device can be widened to 30 GHz or wider and the drive voltage thereof can be reduced to 3.5 V or lower. Thereby, a waveguide type optical modulator to realize a high-speed communication system for, e.g., 40 Gb/s can be obtained.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A waveguide type optical device with a traveling wave electrode structure, comprising:

a crystal substrate with electro-optic effect;

an optical waveguide that is formed on said crystal substrate and waveguides light wave;

a buffer layer that is formed on at least said optical waveguide and is of a dielectric material; and a signal electrode and an earth electrode that are formed on said buffer layer and control the optical output intensity of light wave waveguided through said optical waveguide;

wherein said traveling wave electrode structure is composed of said one signal electrode and said two earth electrodes that are disposed sandwiching said signal electrode, at least said signal electrode of said traveling wave electrode structure is of a material that has a specific resistivity of $2.1 \times 10^{-6}$ Ωcm or lower at an environmental temperature that said waveguide type optical device is used.

2. The waveguide type optical device, according to claim 1, wherein:

said signal electrode and said earth electrode have the top covered with metal film that is not oxidized even when exposed in the atmosphere for a long period.

3. The waveguide type optical device, according to claim 1, wherein:

said signal electrode and said earth electrode have the top and sides covered with metal film that is not oxidized even when exposed in the atmosphere for a long period.

4. The waveguide type optical device, according to claim 1, wherein:

said at least said signal electrode of said traveling wave electrode structure is of silver.

5. A waveguide type optical device with a traveling wave electrode structure, comprising:

a crystal substrate with electro-optic effect;

an optical waveguide that is formed on said crystal substrate and waveguides light wave;

a buffer layer that is formed on at least said optical waveguide and is of a dielectric material; and a signal electrode and an earth electrode that are formed on said buffer layer and control the optical output intensity of light wave waveguided through said optical waveguide;

wherein said traveling wave electrode structure is composed of said one signal electrode and said one earth electrode that is disposed pairing with said signal electrode, at least said signal electrode of said traveling wave electrode structure is of a material that has a specific resistivity of $2.1 \times 10^{-6}$ Ωcm or lower at an environmental temperature that said waveguide type optical device is used.

6. The waveguide type optical device, according to claim 5, wherein:

said signal electrode and said earth electrode have the top and sides covered with metal film that is not oxidized even when exposed in the atmosphere for a long period.

7. The waveguide type optical device, according to claim 5, wherein:

said signal electrode and said earth electrode have the top covered with metal film that is not oxidized even when exposed in the atmosphere for a long period.

8. The waveguide type optical device, according to claim 5, wherein:

said at least said signal electrode of said traveling wave electrode structure is of silver.

* * * * *